(12) United States Patent
Musuvathy et al.

(10) Patent No.: US 12,518,074 B2
(45) Date of Patent: Jan. 6, 2026

(54) OBJECT DESIGN PROCESSING USING COARSE GEOMETRIC ELEMENTS AND HIGH-RESOLUTION LATTICE ELEMENTS

(71) Applicant: Siemens Industry Software Inc., Plano, TX (US)

(72) Inventors: Suraj Ravi Musuvathy, Princeton Junction, NJ (US); David Madeley, Louth (GB); Lucia Mirabella, Plainsboro, NJ (US); Stefan Gavranovic, Putzbrunn (DE); Dirk Hartmann, Aßling (DE)

(73) Assignee: Siemens Industry Software Inc., Plano, TX (US)

( * ) Notice: Subject to any disclaimer, the term of this patent is extended or adjusted under 35 U.S.C. 154(b) by 946 days.

(21) Appl. No.: 17/629,967

(22) PCT Filed: Aug. 27, 2019

(86) PCT No.: PCT/US2019/048262
§ 371 (c)(1),
(2) Date: Jan. 25, 2022

(87) PCT Pub. No.: WO2021/040696
PCT Pub. Date: Mar. 4, 2021

(65) Prior Publication Data
US 2022/0253576 A1 Aug. 11, 2022

(51) Int. Cl.
*G06F 30/23* (2020.01)
*B29C 64/393* (2017.01)
(Continued)

(52) U.S. Cl.
CPC ............ *G06F 30/23* (2020.01); *B29C 64/393* (2017.08); *B33Y 50/02* (2014.12); *G06F 30/17* (2020.01);
(Continued)

(58) Field of Classification Search
CPC .. G06F 2113/10; G06F 2119/18; G06F 30/17; G06F 30/23; B33Y 50/00; B33Y 50/02; B29C 64/393
See application file for complete search history.

(56) References Cited

U.S. PATENT DOCUMENTS 10,664,560 B2 * 5/2020 Pal .......................... G06F 30/23
10,891,786 B2 * 1/2021 Zeng .................... G05B 19/408
(Continued)

FOREIGN PATENT DOCUMENTS

CN 107025340 A 8/2017
CN 107850985 A * 3/2018 ........... B29C 64/386
(Continued)

OTHER PUBLICATIONS

PCT Search Report dated May 25, 2020, for PCT Application No. PCT/US2019/048262, 11 pages.
(Continued)

*Primary Examiner* — Topaz L. Elliott

(57) ABSTRACT

A computing system may include a design access engine and a design processing engine. The design access engine may be configured to access an object design to be constructed through additive manufacturing. The design processing engine may be configured to represent the object design as a combination of coarse geometric elements and high-resolution lattice elements and process the object design based on both the coarse geometric elements and the high-resolution lattice elements. Processing of the object design may include generation of lattice infills, lattice simulations, or a combination of both.

18 Claims, 8 Drawing Sheets

(51) Int. Cl.
*B33Y 50/02* (2015.01)
*G06F 30/17* (2020.01)
*G06F 113/10* (2020.01)
*G06F 119/18* (2020.01)

(52) U.S. Cl.
CPC ...... *G06F 2113/10* (2020.01); *G06F 2119/18* (2020.01)

(56) References Cited

U.S. PATENT DOCUMENTS

| | | | |
|---|---|---|---|
| 11,010,504 B2* | 5/2021 | De Lange | B22F 10/80 |
| 11,520,944 B2* | 12/2022 | Allen | G06F 30/00 |
| 2003/0226410 A1 | 12/2003 | Tsunoda et al. | |
| 2006/0276925 A1 | 12/2006 | Lin et al. | |
| 2008/0184153 A1 | 7/2008 | Matsumura et al. | |
| 2009/0024347 A1 | 1/2009 | Chandra et al. | |
| 2014/0363481 A1* | 12/2014 | Pasini | A61L 27/56 703/1 |
| 2016/0321384 A1* | 11/2016 | Pal | B33Y 50/02 |
| 2018/0210943 A1* | 7/2018 | Carruesco Llorens | B33Y 50/02 |
| 2018/0321659 A1* | 11/2018 | Dasappa | B29C 64/118 |
| 2018/0365342 A1* | 12/2018 | Allen | G06F 30/00 |
| 2019/0152139 A1* | 5/2019 | Ulichney | B29C 64/171 |
| 2019/0205499 A1* | 7/2019 | De Lange | B29C 64/153 |
| 2020/0086624 A1* | 3/2020 | Daynes | B32B 5/14 |
| 2020/0150623 A1* | 5/2020 | Bandara | G05B 19/182 |
| 2020/0209832 A1* | 7/2020 | Behandish | G06F 30/23 |
| 2020/0262149 A1* | 8/2020 | Zydzik | B29C 64/393 |

FOREIGN PATENT DOCUMENTS

| | | | |
|---|---|---|---|
| CN | 108647405 A * | 10/2018 | G06F 64/386 |
| CN | 108897956 A | 11/2018 | |
| CN | 109670200 A | 4/2019 | |
| WO | WO-2017088134 A1 * | 6/2017 | B33Y 50/00 |
| WO | WO-2018031594 A1 * | 2/2018 | B29C 64/118 |
| WO | 2018054502 | 3/2018 | |
| WO | 2018054502 A1 | 3/2018 | |
| WO | WO-2019103774 A1 * | 5/2019 | |

OTHER PUBLICATIONS

Wang Zhonglei et al:; "HexahedralMeshRegenerationMethod Basedon DoubleAdaptiveMeshing"; Chinese Journal of ComputationalMechanics, Issue 03; Jun. 15, 2011.

* cited by examiner

OBJECT DESIGN PROCESSING USING COARSE GEOMETRIC ELEMENTS AND HIGH-RESOLUTION LATTICE ELEMENTS

BACKGROUND

Computer systems can be used to create, use, and manage data for products and other items. Examples of computer systems include computer-aided design (CAD) systems (which may include computer-aided engineering (CAE) systems), computer-aided manufacturing (CAM) systems, visualization systems, product data management (PDM) systems, product lifecycle management (PLM) systems, and more. These systems may include components that facilitate the design and simulated testing of product structures and product manufacture.

BRIEF DESCRIPTION OF THE DRAWINGS

Certain examples are described in the following detailed description and in reference to the drawings.

DETAILED DESCRIPTION

Figure 1:
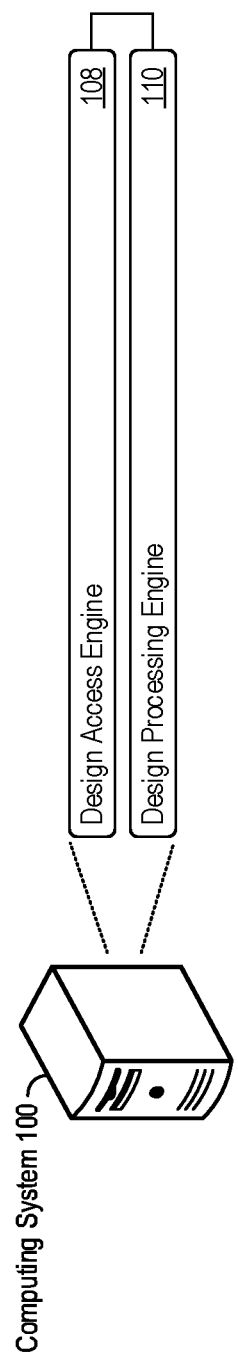
FIG. 1 shows an example of a computing system that supports object design processing using coarse geometric elements and high-resolution lattice elements.

Additive manufacturing (sometimes referred to as 3-dimensional or 3D printing) may be performed through use of 3D printers that can construct objects on a layer-by-layer basis. Through increasing additive manufacturing capabilities, manufacture of arbitrary and complex product designs has become increasing possible. Within a given design space, previous manufacturing limitations have become overcome through additive manufacturing, and product designers now have increasing design freedoms that support optimization of manufactured objects. Moreover, additive manufacture can enable the manufacturing of parts with unique physical properties through design or control of the part's geometric structure, including the design of microstructures that form an internal geometry of the object design.

For objects designed for construction via additive manufacturing, lattice structures can provide a light-weight and efficient mechanism to form internal geometries of object designs to meet certain physical or geometric properties. As used herein, a lattice structure may refer to any 2-dimensional (2D) or 3-dimensional (3D) combination of design elements (e.g., beams) that intersect or otherwise cross over each other with spaces in between. Example lattice structures include structured lattices (e.g., 2D or 3D grids with beams arranged in regularly spaced intervals) or bone-like lattices (e.g., non-linear or curved beams that intersect at irregular angles to mimic natural bone density patterns).

While lattice structures constructed through additive manufacturing can provide efficient and cost-efficient capabilities to infill an object design, the design of lattice structures to meet certain physical or geometric characteristics can be computationally expensive. This may be especially the case when lattice designs are designed at increasingly microscopic levels. Moreover, simulation of lattice structures to validate physical performance can be computationally intense, especially as discretization of lattice structures for finite element analysis (FEA) may require 3D finite elements finer than the width or size of lattice beams or struts. As such, design and simulation of lattice structures may be required for effective manufacture of part designs, but such design and simulation may incur computational latencies or resource requirements not typically available for modern CAD systems, CAM systems, or addictive manufacturing (e.g., 3D printing) systems.

The disclosure herein may provide systems, methods, devices, and logic for object design processing using coarse geometric elements and high-resolution lattice elements. In doing so, the technology and features described herein may improve the efficiency of lattice design or simulation. As described in greater detail below, coarse geometric elements may be used to characterize certain portions of an object design, such as to specify an average density value for different portions of an object design. Local topology optimization using such spatially-varying average density values may support generation of lattice infill structures in a localized and sequential manner. As such, some of the features described herein may localize lattice infill generation of high-resolution lattice elements, which may reduce the computational latency or resources required to generate a lattice design (including bone-like lattice designs).

As another example, the features described herein may support simulation of lattice structures with increased efficiency. An object design may be segmented into different fidelity regions, and high-fidelity regions may be represented using high-resolution 3D lattice elements to provide physical analyses with greater accuracy. Low-fidelity regions of the object design may be represented instead using coarse geometric elements, which may be characterized through averaged or homogenized material properties. By doing so, lattice simulations may performed with increased speed or efficiency as compared to a total high-resolution representation of the object design. As such, the features described herein may support physics analyses of object designs comprised of complex lattice structures with increased efficiency while maintaining high simulation fidelity and analysis accuracy.

These and other features and technical benefits are described in greater detail herein.

FIG. 1 shows an example of a computing system that supports object design processing using coarse geometric elements and high-resolution lattice elements. The computing system 100 may take the form of a single or multiple computing devices such as application servers, compute nodes, desktop or laptop computers, smart phones or other mobile devices, tablet devices, embedded controllers, and more. In some examples, the computing system 100 is part of or implements (at least in part) a CAD system, a CAM system, or a 3D printing system. In that regard, the computing system 100 may support the design or simulation of lattice structures located within an object design.

As an example implementation to support any combination of the features described herein, the computing system 100 shown in FIG. 1 includes an design access engine 108 and a design processing engine 110. The computing system 100 may implement the engines 108 and 110 (including components thereof) in various ways, for example as hardware and programming. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the computing system 100 implements multiple engines using the same computing system features or hardware components (e.g., a common processor or a common storage medium).

Figure 2:
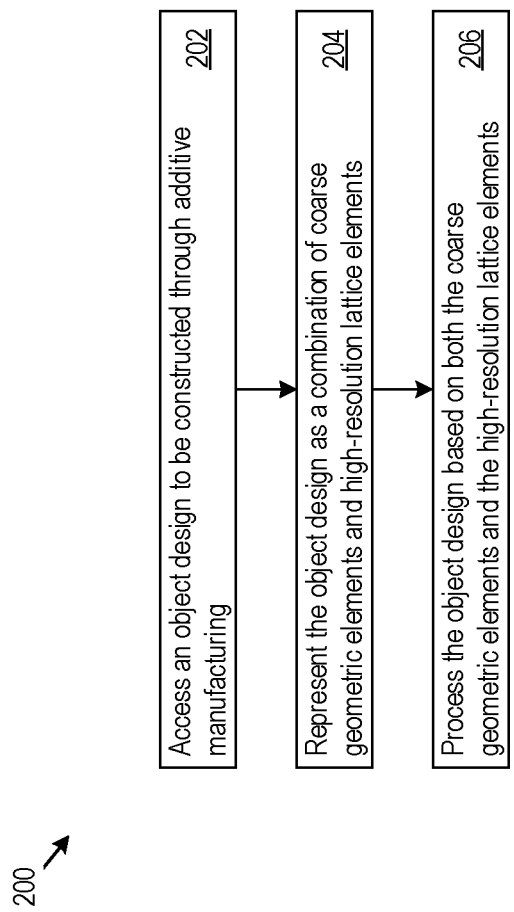
FIG. 2 shows an example of logic that a system may implement to support object design processing using coarse geometric elements and high-resolution lattice elements.

Example operation and features of the design access engine 108 and design processing engine 110 are described throughout herein, for example through logic as presented next in FIG. 2.

FIG. 2 shows an example of logic 200 that a system may implement to support object design processing using coarse geometric elements and high-resolution lattice elements. As one example, the computing system 100 may implement the logic 200 as hardware, executable instructions stored on a machine-readable medium, or as a combination of both. The computing system 100 may implement the logic 200 via the design access engine 108 and the design processing engine 110, through which the computing system 100 may perform or execute the logic 200 as a method to support lattice infill generation or lattice simulation using coarse geometric elements and high-resolution lattice elements. The following description of the logic 200 is provided using the design access engine 108 and the design processing engine 110 as examples. However, various other implementation options by systems are possible.

In implementing the logic 200, the design access engine 108 may access an object design to be constructed through additive manufacturing (202). The object design may take the form of any representation of an object, such as 3D geometry or 3D object model.

In implementing the logic 200, the design processing engine 110 may represent the object design as a combination of coarse geometric elements and high-resolution elements (204). For lattice infill generations, such a representation may be distinct in the sense that the design processing engine 110 may first represent the entire object design as coarse geometric elements and subsequently represent the object design via high-resolution lattice elements included as part of generated lattice infill structures. At given points in sequential lattice infill generations, the design processing engine 110 may also represent an object design as a combination of both coarse geometric elements and high-resolution lattice elements. For lattice simulations, the design processing engine 110 may concurrently represent the object design as a combination of both coarse geometric elements and high-resolution lattice elements, and in some examples further include 1-dimensional (1D) lattice beam elements as well.

The design processing engine 110 may process the object design based on both the coarse geometric elements and the high-resolution lattice elements (206). As noted herein, such processing may include lattice infill generations for an object design, lattice simulations for the object design, or a combination of both. These features are described in greater detail next through FIGS. 3-7. In particular, example lattice infill generation features according to the present disclosure are described in connection with FIGS. 3-5 and example lattice simulation features are described in connection with FIGS. 6-7.

Figure 3:
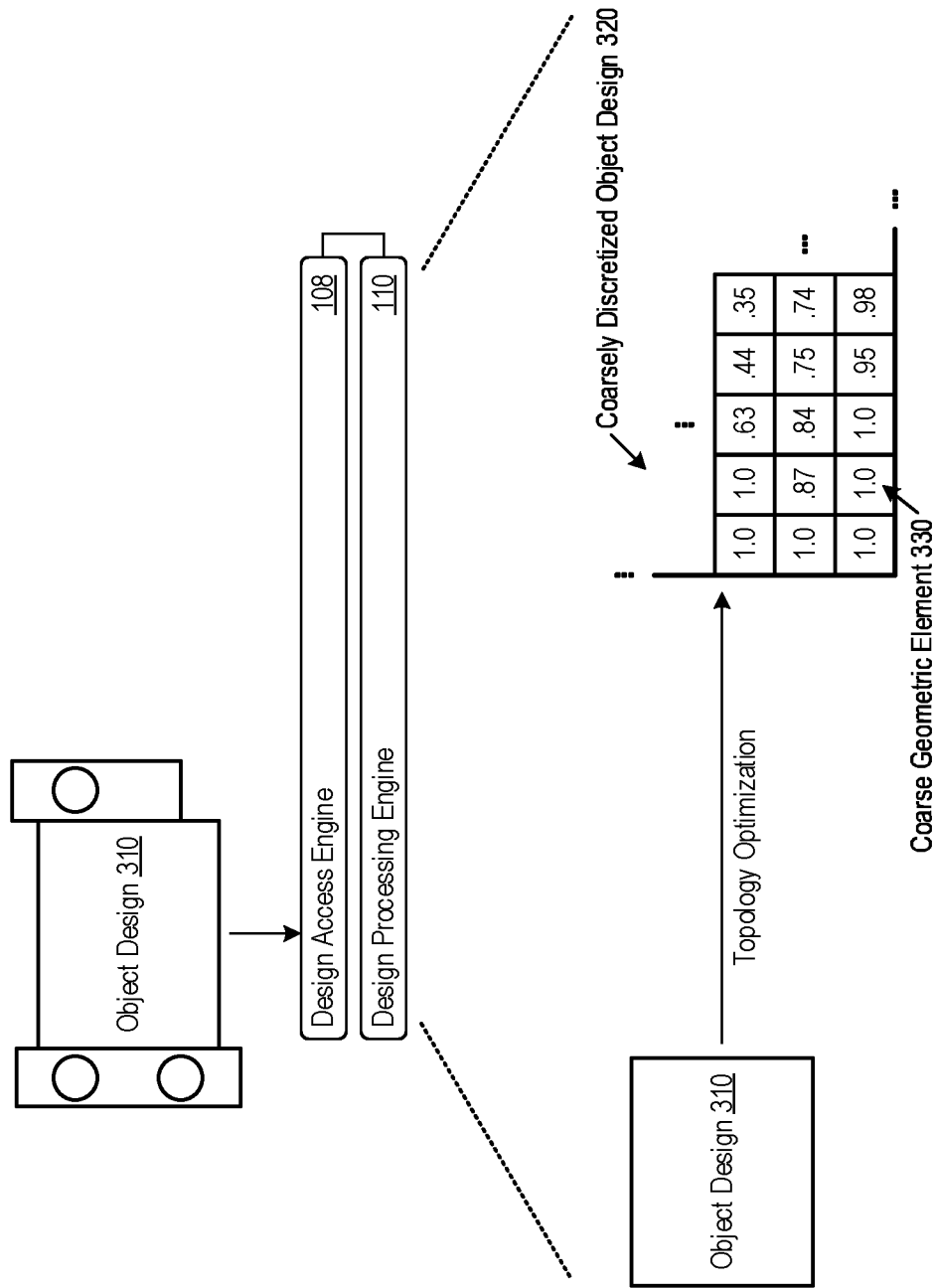
FIG. 3 shows an example of coarse discretization that a computing system may perform to support generation of bone-like lattice infill structures.

FIG. 3 shows an example of coarse discretization that a computing system may perform to support generation of bone-like lattice infill structures. In the particular example shown in FIG. 3, a computing system is illustrated in the form of a design access engine 108 and a design processing engine 110. However, other system implementations are contemplated herein.

As seen FIG. 3, the design access engine 108 may access an object design 310. An object design 310 may represent a part (or portions thereof) designed for construction through additive manufacturing. For instance, the object design 310 in FIG. 3 may be part of a larger part design that includes fixed design regions that border portions of the object design 310. As such, the object design 310 may represent a design space that can be filled, designed, optimized, or otherwise specified by a CAD system, CAM system, or 3D printing system.

The design processing engine 110 may process the object design 310 by generating a lattice infill for the object design 310. To do so, the design processing engine 110 may employ a two-step approach for infill generation, including (i) determining average lattice property specifications for the object design 310, and (ii) generating a lattice infill for the object design 310 from the average latticed property specifications. These steps are each described in turn.

In a first step, the design processing engine 110 may determine an average lattice property specification for the object design 310, for example as a density distribution for the object design 310. To do so, the design processing engine 110 may perform a topology optimization on the object design 310. The topology optimization may be performed according number or combination of topology optimization techniques, e.g., according to a finite element method (FEM), a Solid Isotropic Microstructures with Penalization (SIMP) method, finite element analysis, etc. The topology optimization performed by the design processing engine 110 in this first step may be a global topology optimization in that it is performed across the entire design space formed by the object design 310.

In some examples, the design processing engine 110 may perform a global topology optimization without penalization, such as without application of any SIMP penalty parameters. Penalization parameters may be configured to push design elements of a topology optimization towards convergence to a 0% or 100% density value for the object design 310 (e.g., expressed as normalized density values between 0.0 and 1.0). By removing penalization parameters from the topology optimization, the design processing engine 110 may determine average density values for the object design 310 across the entire density distribution from 0-100% as opposed to a density determination (with penalization parameters) concentrated on 0% and 100% density values.

The determined average density values may represent target (e.g., optimal) densities that vary across different portions of the object design 310. As such, determined average density values may spatially-vary across the object design 310. In determination of the average densities, the design processing engine 110 need not resolve fine geometries for a detailed lattice infill. Accordingly, the design processing engine 110 may use a coarse discretization for performing the topology optimization on the object design 310. Such a coarse discretization may refer to a discretizing the object design 310 at a lower granularity or lower element size resolution than the resolution/discretization size of a subsequently generated lattice infill for the object design 310.

One example of a coarse discretization is shown in FIG. 3, in which the design processing engine 110 may discretize the object design 310 into the coarsely discretized object design 320. The coarsely discretized object design 310 may be comprised of multiple coarse geometric elements, such as the coarse geometric element 330 shown in FIG. 3. Each coarse geometric element may be characterized with a determined average density value respectively. In FIG. 3, the coarse geometric element 330 has as a determined average density value of 1.0.

Note that the coarse geometric element 330 may be coarse in that it is discretized by the design processing engine 110 at a coarser granularity than lattice elements the design processing engine 110 may subsequently generate as part of infill structures. In that regard, the resolution of the coarsely discretized object design 320 may be lower than the resolution of subsequently generated lattice infill structures.

As noted herein, the design processing engine 110 may perform a global topology optimization to determine respective average density values for coarse geometric elements that comprise the coarsely discretized object design 320. The average density values shown in FIG. 3 are normalized to a range of 0.0 (0% density) to 1.0 (100% density) and spatially vary in value across different portions (and across different coarse geometric elements) of the coarsely discretized object design 320. As seen, the average density values computed by the design processing engine 110 need not converge to 0.0 and 1.0, allowing for a wider range of average (or optimal) density values across the object design 310. In any of the ways described herein, the design processing engine 110 may determine average lattice property specifications for the object design 310 in a first step of lattice infill generation.

In a second step of lattice infill generation, the design processing engine 110 may generate lattices from the determined average latticed property specifications. The design processing engine 110 may generate lattice infills in multiple ways. As one example, the design processing engine 110 may generate a lattice infill structure via programmatic processes. Through programmatic processes, the design process engine 110 may fill (up to) the entirety of the object design 310 by selecting lattice bar densities such that the computed average density values are satisfied at corresponding portions of the object design 310. Such programmatic processes may result in generation of a structured lattice infill, e.g., in the form of a grid. However, these grid-like, uniform, or symmetrical lattice structures may lack the robustness, strength, or sturdiness of bone-like lattice structures.

As another example of lattice generation, the design processing engine 110 may generate a lattice infill through topology optimization. In doing so, the design processing engine 110 may perform topology optimization (e.g., via FEA or FEM) with a local density constraint (e.g., the spatially-varying average density values determined in step one) and do so instead of using a global density constraint (e.g., average density value of the object design 310 equals a fixed density value). Such a topology optimization may be represented as the following topology optimization functions:

$$\min_{p_e} c = \frac{1}{2} U^T \cdot K \cdot u,$$

$$\text{s.t. } K(p_e) \cdot u = f,$$

$$p_e \in \{0, 1\}, \forall e,$$

$$\overline{p_e} = \frac{\sum_{i \in N_e} p_i}{\sum_{i \in N_e} 1} \leq \alpha(x), \forall e$$

In this example, an objective function may be expressed to minimize the compliance/strain energy c, with displacement u due to applied force f and stiffness matrix K. Also in this example, $N_e$ may represent a defined neighborhood for a given finite element e.

Were the design processing engine 110 to perform the topology optimization functions expressed above for the entirety of the object design 310 using the computed and varying average density values (e.g., as a global topology optimization with local density constraints), up to millions of degrees of freedom or more may need to be accounted for in order to optimize the entirety of the object design 310. Such computations may incur high execution latencies or require tremendous computing power to generate a corresponding lattice infill. Using global topology optimization to generate lattice infills may not be business-feasible or may require significant business costs to secure adequate computational resources.

Instead of addressing the entire object design 310 globally, the design processing engine 110 may employ a sequential approach to locally generate multiple infill structures that may reduce computational requirements. That is, the design processing engine 110 may partition the object design 310 into various segments, and the size of partitioned segments may be configurable to control computational costs. Then, the design processing engine 110 may generate a lattice infill structure for each segment using any (e.g., all) applicable average density values within the segment. In such a way, the design processing engine 110 may sequentially build up a lattice infill through consecutive and local generation of lattice infill structures. Examples of this capability are described in greater detail next through FIG. 4.

Figure 4:
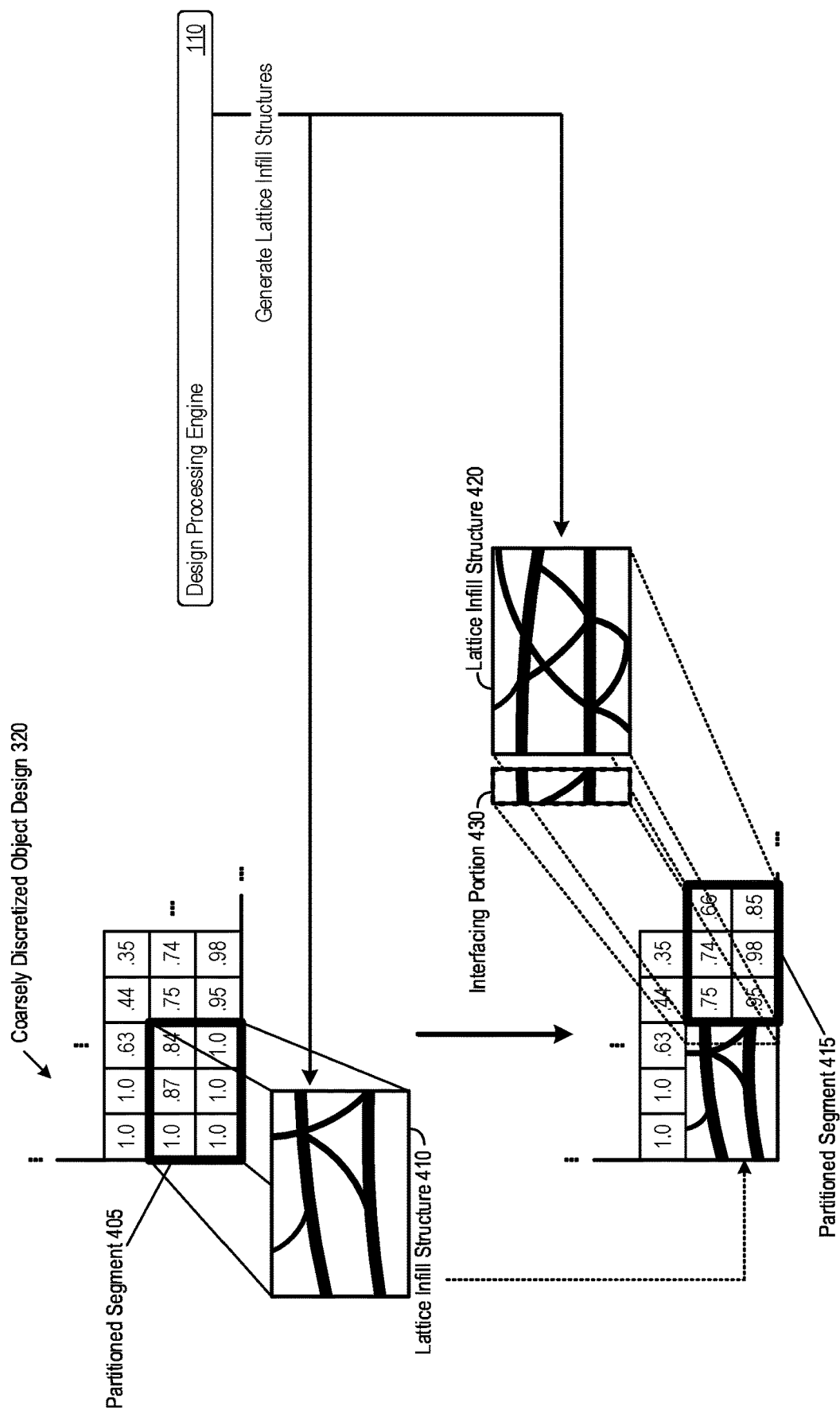
FIG. 4 shows examples of lattice infill structures that a design processing engine may generate.

FIG. 4 shows examples of lattice infill structures that the design processing engine 110 may generate. In FIG. 4, the design processing engine 110 may generate the lattice infill structure 410 from a partitioned segment 405 of an object design (e.g., the object design 310 or the coarsely discretized object design 320). The partitioned segment 405 may encompass any number of coarse geometric elements, such as six (6) coarse geometric elements of the coarsely discretized object design 320 in the example shown in FIG. 3.

To generate the lattice infill structure 410, the design processing engine 110 may perform a local topology optimization process using average density values applicable to the partitioned segment 405 as local density constraints. That is, instead of using the entire set of determined average density values for the entire object design 310, the design processing engine 110 may perform a localized topology optimization using average density values within the localized portion (e.g., the partitioned segment 405). Doing so may (in some cases drastically) reduce the degrees of design freedom to account for and reduce computational complexities to improve performance in generating lattice infills.

In performing the local topology optimization, the design processing engine 110 may discretize the partitioned segment 405 at a finer granularity than the size of the coarse geometric elements. Such a discretization of the partitioned segment 405 may result in the eventual generation of high-resolution lattice elements that form the lattice infill structure 410 (e.g., at a finer or higher resolution than the coarse geometric elements that form the coarsely discretized object design 320). To generate the lattice infill structure 410, the design processing engine 110 may utilize the topology optimization functions specified above, though localized to the partitioned segment 405 (e.g., using only the average density values applicable to the partitioned segment 405).

The localized topology optimizations used for generation of infill structures may result in bone-like lattice generation on a micro-scale. That is, each generated lattice infill structure for a partitioned segment may be treated as a local computation and thus optimized independent (at least in part) of how other non-neighboring lattice infill structures are generated. Local topology optimizations may also yield bone-like lattice generations, since the average density values may vary across the partitioned segments and yield asymmetrical, bone-like lattices that may exhibit improved robustness and strength as compared to structured lattice designs.

In generating the lattice infill structure 410, the design processing engine 110 may apply any number of boundary conditions, whether conditions applicable at a global level or a local level. For instance, simulations during the global topology optimization to determine average density values for the coarsely discretized object design 320 may derive global boundary conditions for various portions of the object design 310. Such boundary conditions, as applicable specifically to the partitioned segment 405 of the object design 310 may be applied during the local topology optimization performed by the design processing engine 110 to generate the lattice infill structure 410.

Additionally or alternatively, boundary conditions based on other generated lattice infill structures may be applied to form smooth transitions between lattice infill structures generated by the design processing engine 110 for consecutive or neighboring segments of object design 310.

An example of such a boundary condition is shown in FIG. 4 through generation of the lattice infill structure 420 by the design processing engine 110. In generating a lattice infill topology to cover the entire object design, the design processing engine 110 may generate lattice infill structures sequentially (e.g., starting in a bottom left corner of the object design and consecutively generating lattice infill structures from bottom to top, snaking across the width of the object design 310). In some examples, the design processing engine 110 generates the lattice infill structure 420 after generation of the lattice infill structure 410.

In generating the lattice infill structure 420 (after generation of the lattice infill structure 410), the design processing engine 110 may account for an interfacing portion of a previously generated lattice infill structure. In the example shown in FIG. 4, the design processing engine 110 accounts for the interfacing portion 430 of the lattice infill structure 410 that borders a partitioned segment 415 used to generate the lattice infill structure 420. The interfacing portion 430 of the lattice infill structure 410 may serve, in effect, as a boundary condition for generation of the lattice infill structure 420 to ensure smooth transitions between the lattice elements of the respective lattice infill structures 410 and 420.

Explained in another way, the interfacing portion 430 and partitioned segment 415 may serve as a design space for a local topology optimization to generate the lattice infill structure 420. The interfacing portion 430 may be a fixed design region such that the local topology optimization to generate the lattice infill structure 420 cannot change the design of the interfacing portion 430, but the interfacing portion 430 may specify constraints for the local topology optimization on the partitioned segment 415. While the interfacing portion 430 is shown as one example, the design processing engine 110 may identify and account for interface portions of multiple previously-generated lattice infill structures (e.g., for a given lattice infill structure to be generated that borders previously generated lattice infill structures below, to the left, to the right, or above the given lattice infill structure).

In such a way, the design processing engine 110 may subdivide an object design into partitioned segments and generate a corresponding lattice infill structure for each partitioned segment. The design processing engine 110 may sequentially generate lattice infill structures from the partitioned segments (e.g., comprised of coarse geometric elements with specified average density values) until a completed lattice infill is generated for the object design 310.

In generating lattice infill structures, the size of partitioned segments may be configurable to control computational costs. The larger the segment size, the greater the computational requirements may be to perform a local topology optimization and vice versa. As such, the design processing engine 110 may partition the object design 310 according to various segmenting criteria based on trade-offs with regards to available computational resources (e.g., in a cloud computing environment with more resources than a local build processor of a 3D printer), latencies, network bandwidth, and the like.

Although various object design and lattice infill examples shown in FIGS. 3 and 4 are depicted in 2D, the lattice infill features described herein may be consistently applied for any 3D object designs and lattice infill structures.

Figure 5:
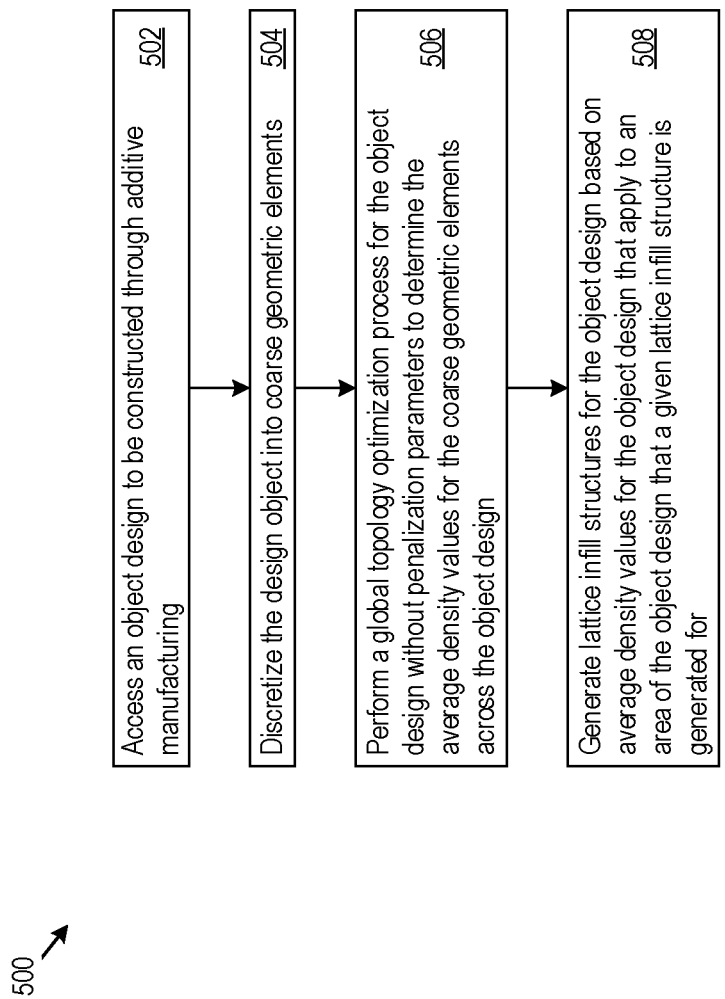
FIG. 5 shows an example of logic that a system may implement to support generation of lattice infill structures based on average density values represented through coarse geometric elements.

FIG. 5 shows an example of logic 500 that a system may implement to support generation of lattice infill structures based on average density values represented through coarse geometric elements. For example, the computing system 100 may implement the logic 500 as hardware, executable instructions stored on a machine-readable medium, or as a combination of both. The computing system 100 may implement the logic 500 via the design access engine 108 and the design processing engine 110, through which the computing system 100 may perform or execute the logic 500 as a method to support lattice infill generation using coarse geometric elements and high-resolution lattice elements. The following description of the logic 500 is provided using the design access engine 108 and the design processing engine 110 as examples. However, various other implementation options by systems are possible.

In implementing the logic 500, the design access engine 108 may access an object design to be constructed through additive manufacturing (502). In implementing the logic 500, the design processing engine 110 may discretize the object design into the coarse geometric elements (504) and perform a global topology optimization process for the object design without penalization parameters to determine the average density values for the coarse geometric elements across the object design (506). Then, the design processing engine 110 may generate lattice infill structures for the object design based on average density values for the object design that apply to an area of the object design that a given lattice infill structure is generated for (508).

For instance, the design processing engine 110 may generate a first lattice infill structure for the object design based on a given average density value (or multiple average density values) for the object design applicable to an area (e.g., partitioned segment) of the object design that the first lattice infill structure is generated for. Generation of the first lattice infill structure may include performing a local topology optimization process using the given average density value as a local density constraint (or multiple density value as applicable to a partitioned segment as spatially-varying local density constraints). In performing the local topology optimization, the design processing engine 110 may include discretize the partitioned segment into finite elements at a finer granularity or higher resolution than the coarse geometric elements, which may allow the design processing engine 110 to generate the first lattice infill structure to include high-resolution lattice elements and finely detail lattice geometries of the object design.

The design processing engine 110 may further generate a second lattice infill structure for the object design based on a different average density value for the object design that applies to an area (e.g., another partitioned segment) of the object design that the second lattice infill structure is generated for. The design processing engine 110 may do so using an interfacing portion of the first infill structure as boundary conditions for generating the second infill structure. In a consistent manner, the design processing engine 110 may sequentially generate other lattice infill structures until an entire lattice infill topology is generated for the object design.

The logic 500 shown in FIG. 5 provides an illustrative example by which a computing system 100 may support lattice infill generation using coarse geometric elements and high-resolution lattice elements. Additional or alternative steps in the logic 500 are contemplated herein, including according to any features described herein for the design access engine 108, design processing engine 110, or any combinations thereof.

In the various ways described above, the design access engine 108 and design processing engine 110 may support generation of lattice infills for an object design using coarse geometric elements and high-resolution lattice elements. As noted herein, the coarse geometric elements may represent average density values across the object design, and the high-resolution lattice elements may be part of lattice infill structures constructed for the object design from the average density values represented by the coarse geometric elements. Through such a localization technique, bone-like lattice structures may be achieved with increased robustness or improved performance characteristics while also limiting computational requirements through use of localized topology optimizations. As such, lattice generation may be performed using the features described herein with increased speed and efficiency.

Technical features and benefits are contemplated herein as well for simulation of lattice structures using coarse geometric elements and high-resolution lattice elements, as described next in connection with FIGS. 6 and 7.

Figure 6:
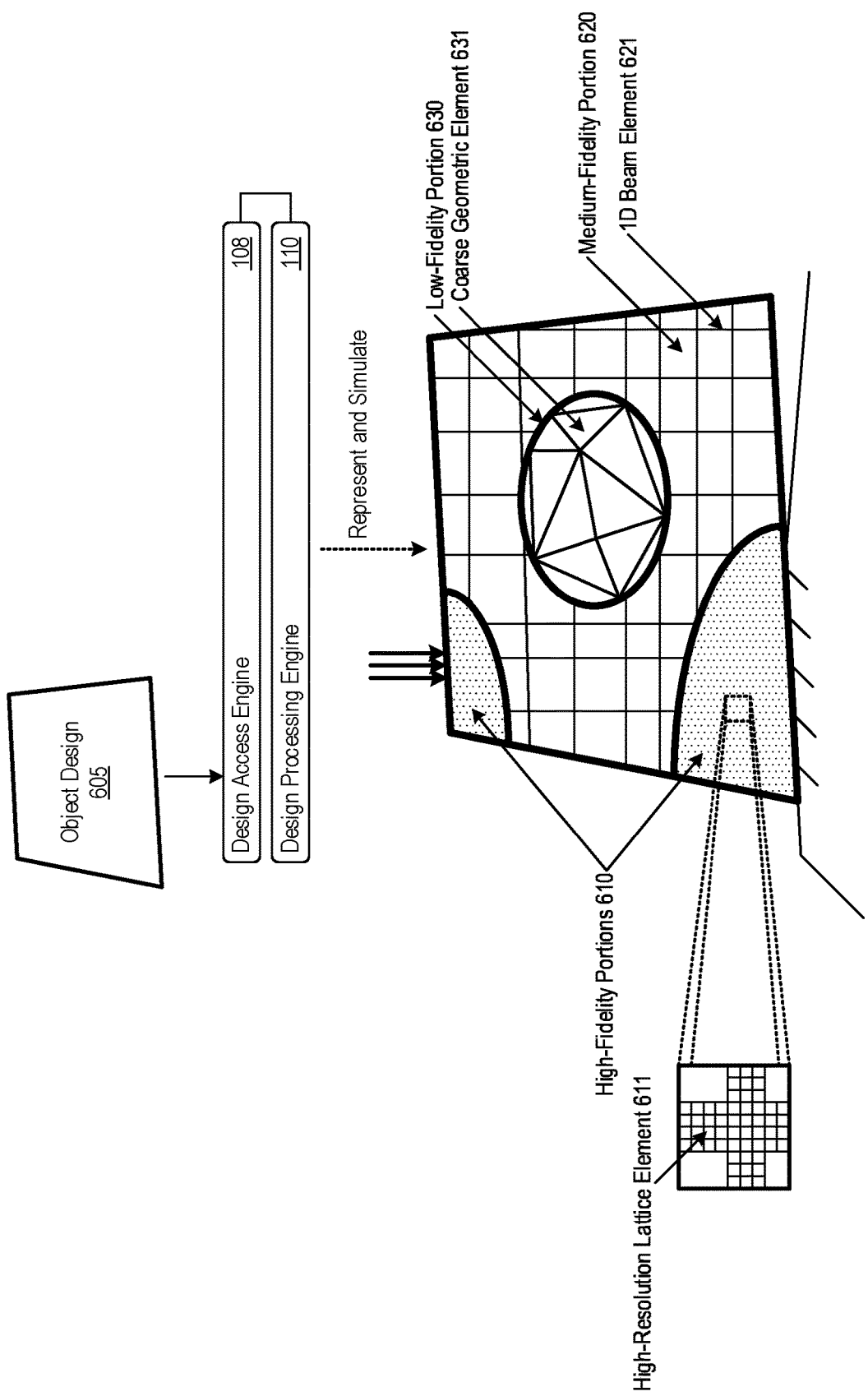
FIG. 6 shows an example simulation of an object design using determined fidelity portions that include coarse geometric elements and high-resolution lattice elements.

FIG. 6 shows an example simulation of an object design using determined fidelity portions that include coarse geometric elements and high-resolution lattice elements. In the particular example shown in FIG. 6, a computing system is illustrated in the form of a design access engine 108 and a design processing engine 110. However, other system implementations are contemplated herein.

In FIG. 6, the design access engine 108 may access an object design 605. The object design 605 may include a lattice structure, for example as an internal geometric for the object design 605. The internal lattice structure of the object design 605 may be specified in various ways, e.g., as CAD geometry, and the design processing engine 110 may support simulation of the object design 605 and physical analysis of the lattice structure of the object design 605.

To support lattice structure simulation, the design processing engine 110 may selectively segment the object design into different fidelity regions. Different fidelity regions may correspond to varying levels of design fidelity in order to model or simulate the object design 605 to a threshold degree of accuracy. In the example shown in FIG. 6, the design processing engine 110 may segment the object design 605 into three (3) different fidelity portions labeled as a high-fidelity portions 610, a medium-fidelity portion 620, and a low-fidelity portion 630.

The high-fidelity portions 610 may represent portions of the object design 605 in which a high degree of modeling fidelity is required to accurately simulate physical behavior of the object design 605. Portions of an object design that may require increased fidelity or finer resolutions for accurate simulations may include portions of the object design 605 at which a boundary condition is applied to the object design 605 (e.g., an applied load shown in FIG. 6 as the three arrows pressing down on the object design 605 or object contact points shown at portions of the lower boundary of the object design 605). Other high-fidelity portions of the object design 605 may include lattice structures more significantly impacted by boundary conditions (e.g., load applications), such as high-stress areas of the object design 605. Various ways in which the design processing engine 110 may actually segment or identify fidelity regions in an object design are described in greater detail below.

The design processing engine 110 may represent the high-fidelity portions 610 of the object design 605 with high-resolution lattice elements 611 to support FEA with increased accuracy. In particular, the design processing engine 110 may discretize the high-fidelity portions 610 into a set of 3D finite elements (e.g., tetrahedra, hexahedra, cubes, etc.) to support FEA and solving of governing physics equations on the 3D finite elements. Such 3D finite elements may include high-resolution lattice elements, such as the high-resolution lattice element 611 shown in FIG. 6. The high-resolution lattice elements may be 3D finite elements discretized by the design processing engine 110 at size smaller than the thickness of lattice beams or struts. Doing so may allow the design processing engine 110 to properly and accurately simulate lattice behavior. As seen in FIG. 6, the high-resolution lattice element 611 is one of many 3D finite elements that model a single lattice beam in the object design 605.

While high-resolution lattice elements and finely discretized 3D finite elements may support lattice structure simulations with increased accuracy and fidelity, such fine discretization may yield a very large number of finite elements for FEA simulations. Computational requirements for such simulations may be unreasonably high, and typical workstation-based CAD or CAM systems may have limited computation resources such that performing complex lattice simulations in practical timeframes is near-impossible.

To improve simulation efficiency, the design processing engine 110 may represent only a selected portion of the object design 605 using high-fidelity lattice elements. As noted herein, such a selected portion may comprise determined high-fidelity portion of the object design 605. For medium or low-fidelity portions of the object design 605, the design processing engine 110 may use coarser or efficient representations of internal lattice structures of the object design 605.

For the medium-fidelity portion 620 determined for the object design 605, the design processing engine 110 may use 1D beam elements to represent lattice structures, such as the 1D beam element 621 shown in FIG. 6. For a given lattice beam in the medium-fidelity portion 620, the design processing engine 110 may represent the given lattice beam in a finite element simulation system as a 1D beam element. Such 1D beam elements may provide increased simulation efficiency and performance latency, but at a lesser FEA accuracy than high-resolution lattice elements. Even with this increased efficiency, an object design 605 with a complex lattice structure may require a large number of 1D beam elements making simulation and analysis time-consuming and computationally inefficient.

As such, the design processing engine 110 may determine portions of an object design to represent in a more efficient manner than 1D beam elements. In some examples, the design processing engine 110 may identify low-fidelity portions of an object design to represent as a coarse geometric element. In FIG. 6, the design processing engine 110 identifies the low-fidelity portion 630 and represents the low-fidelity portion 630 in the object design 605 using (at least in part) the coarse geometric element 631. The coarse geometric element 631 may be a (relatively) large 3D element with averaged or homogenized material properties. Such a representation may allow for simulations at increased speeds and reduced computational latencies, but at the cost of simulation accuracy and object behavior fidelity.

By representing different fidelity portions of an object design 605 differently, the design processing engine 110 may selectively segment the object design 605 to increase the efficiency of design simulations. In particular, the design processing engine 110 may represent the object design 605 using high-resolution lattice elements at high-fidelity portions 610 of the object design 605 at which a higher degree of accuracy is required to model and simulate the object design 605. 1D beam elements are used by the design processing engine 110 at a medium-fidelity portion 620 where a reasonable degree of accuracy is required. At a low-fidelity portion 630, coarse geometric elements are used to represent the object design 605 in which a low degree or accuracy is required for modeling and simulation.

In some implementations, the design processing engine 110 may apply suitable interfaces at fidelity portion boundaries to ensure a consistent finite element system is created to simulate the object design 605. In that regard, the design processing engine 110 may insert or apply various interface elements or boundary constraints at fidelity portion boundaries. For instance, the design processing engine 110 may use, apply, or insert a high-resolution-to-coarse boundary element, such as a mesh glue constraint or a conformal mesh at a boundary between a low-fidelity portion 630 and a one of the high-fidelity portions 610 of the object design 605 to connect coarse geometric elements to high-resolution lattice elements.

As another example, the design processing engine 110 may add a coarse-to-1D boundary element at a boundary between the low-fidelity portion 630 and the medium-fidelity portion 620 of the object design 605 to support modeling of energy transfer between a coarse geometric element in the low-fidelity portion 630 and a given 1D beam element in the medium-fidelity portion 620. As yet another example, the design processing engine 110 may add a high-resolution-to-1D boundary element at a boundary between one of the high-fidelity portions 610 and the medium-fidelity portion 620 of the object design 605 to support modeling of energy transfer between high-resolution lattice elements in the high-fidelity portions 610 and 1D beam elements in the medium-fidelity portion 620.

In order to represent the object design 605 in different ways, the design processing engine 110 may segment the object design 605 into different fidelity portions and do so in different ways. In one implementation, the design processing engine 110 may segment the object design 605 based on stress testing of the object design 605. To do so, the design processing engine 110 may analyze the object design through FEA to obtain a stress mapping for the object design. The FEA may be performed using a coarse discretization of the object design 605 to reduce computational latencies. Then, the design processing engine 110 may identify the low-fidelity portion 630 of the object design 605 as a low stress portion of the stress mapping and identify the high-fidelity portions 610 of the object design 605 as a high stress portion of the stress mapping. Medium stress portions of the stress mapping may be identified as the medium-fidelity portion 620. Low stress, medium stress, or high stress portions of a stress mapping may correspond to predetermined stress value ranges for the stress mapping, which may be configurable or set by the design processing engine 110.

As another segmentation approach, the design processing engine 110 may determine fidelity portions based on inaccuracy tolerances between high-fidelity simulation and other representations (e.g., 1D beam elements or coarse geometric elements). To do so, the design processing engine 110 may perform a high fidelity FEA analysis on a selected subset of the lattice structure in the object design 605 (e.g., on a few instances of a considered lattice template). Such a high fidelity FEA analysis may include discretizing the selected subset into high-resolution lattice elements to perform the FEA. From the high fidelity FEA analysis, the design processing engine 110 may compute homogenized material properties for the lattice structure. Then, the design processing engine 110 may perform a low fidelity FEA analysis across the entire object design 605 using the computed homogenized material properties for the lattice structure.

Through the low fidelity FEA analysis, the design processing engine 110 may analyze stress or displacement patterns to characterize portions of the object design 605 (e.g., as low stress or high stress). Such characterization may be in the form of local patterns, which the design processing engine 110 may identify through statistical analysis or other data-drive methodologies. In such a way, the design processing engine 110 may characterize the object design 605 into different portions (e.g., high stress, low stress, medium stress, etc.). For each different portion, the design processing engine 110 may apply a low-fidelity simulation (e.g., with coarse geometric elements with homogenized material properties), medium fidelity simulation (e.g., using 1D beam elements), and/or a high-fidelity simulation (e.g., with high-resolution lattice elements). The design processing engine 110 may apply these simulations of varying fidelity on selected lattice elements or lattice instances in the characterized portion.

By doing so, the design processing engine 110 may compute an error measure from high-fidelity simulations to low-fidelity and medium-fidelity simulations. Based on a specified inaccuracy tolerance, the design processing engine 110 may select representation of characterized portions with a low-fidelity elements (coarse geometric elements), medium-fidelity elements (1D beam elements), or high fidelity elements (high-resolution lattice elements) such that the selected element is the most efficient representation that satisfies the inaccuracy tolerance. In such a way, the design processing engine 110 may identify or determine low-fidelity, medium-fidelity, and/or high-fidelity portions for an object design.

As yet another approach to segment the object design 605, the design processing engine 110 may assign low-fidelity, medium-fidelity, and high-fidelity portions of an object design based on distance criteria. The design processing engine 110 may determine portions of an object design within a high-fidelity threshold distance from a boundary condition as high-fidelity portions. The high-fidelity threshold distance applied by the design processing engine 110 may be a fixed value or may vary depending on the nature or magnitude of the boundary condition. For instance, the design processing engine 101 may compute the high-fidelity threshold distance to apply as a function of the magnitude (e.g., applied force) and encompassed area of the boundary condition, such that the greater the magnitude or covered area, the greater in value the high-fidelity threshold distance applied to determine high-fidelity portions.

In applying distance criteria, the design processing engine 110 may determine low-fidelity regions based on a distance from an object boundary or boundary condition. In such cases, the design processing engine 110 may identify low-fidelity portions of an object design that are positioned further than a low-fidelity threshold distance from a boundary condition or object boundary. Such a distance criteria may identify low-fidelity portions in the object design that are sufficiently distant from boundary conditions or object boundaries, and which may thus require lesser fidelity in FEA simulations. In some examples, the design processing engine 110 may identify medium-fidelity portions of the object design as portions that are not identified as either low-fidelity or high-fidelity portions.

In any of the ways described herein, the design processing engine 110 may determine different fidelity portions of an object design and represent determined fidelity portions differently to support FEA simulations with increased efficiency.

Figure 7:
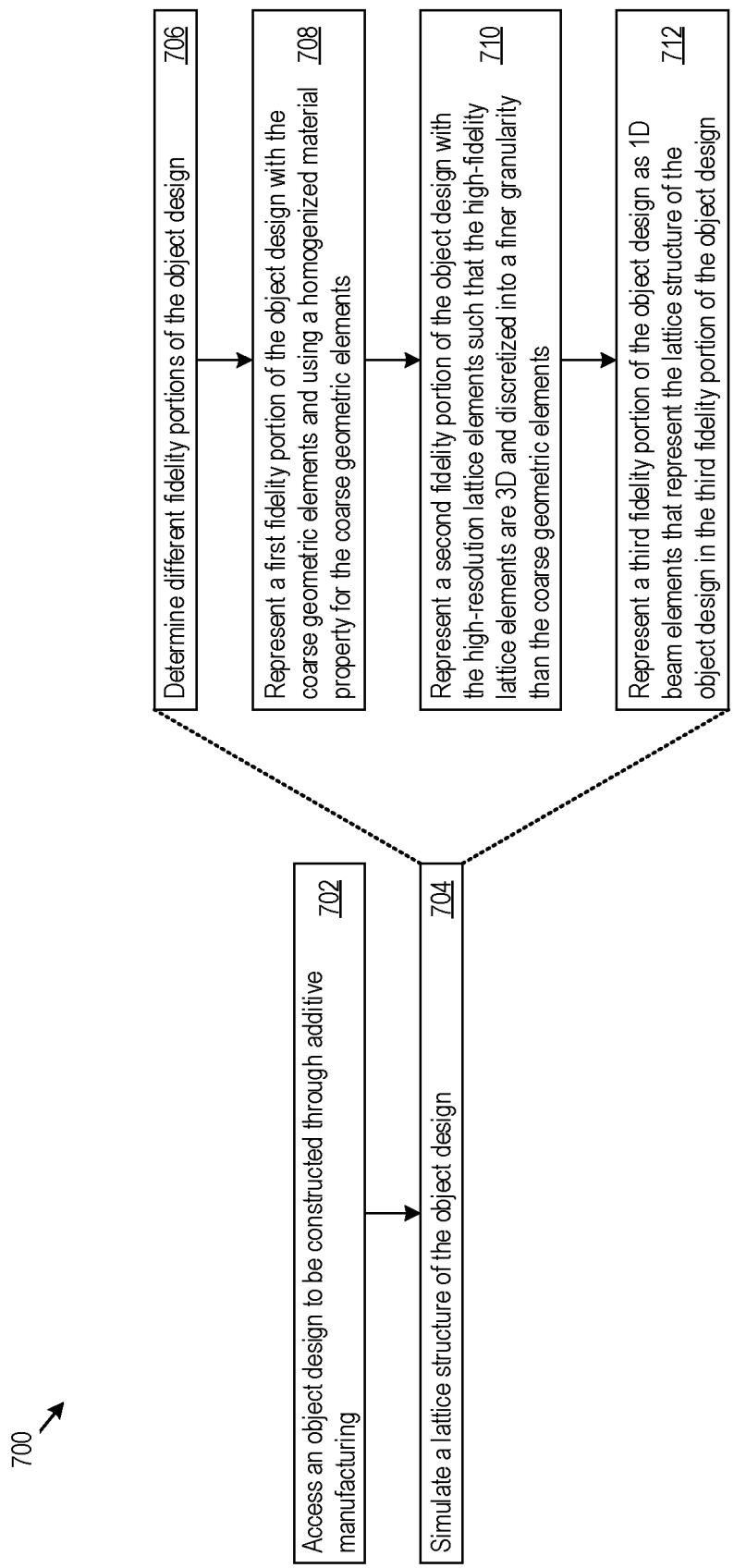
FIG. 7 shows an example of logic that a system may implement to support simulation of an object design represented with different fidelity portions.

FIG. 7 shows an example of logic 700 that a system may implement to support simulation of an object design represented with different fidelity portions. For example, the computing system 100 may implement the logic 700 as hardware, executable instructions stored on a machine-readable medium, or as a combination of both. The computing system 100 may implement the logic 700 via the design access engine 108 and the design processing engine 110, through which the computing system 100 may perform or execute the logic 700 as a method to support lattice simulation using coarse geometric elements and high-resolution lattice elements. The following description of the logic 700 is provided using the design access engine 108 and the design processing engine 110 as examples. However, various other implementation options by systems are possible.

In implementing the logic 700, the design access engine 108 may access an object design to be constructed through additive manufacturing (702). The object design may include a lattice structure. In implementing the logic 700, the design processing engine 110 may simulate a lattice structure of the object design (704). In doing so, the design processing engine 110 may determine different fidelity portions of the object design (706), e.g., in any of the ways described herein. In some examples, the determined fidelity portions may include a high-fidelity portion, a low-fidelity portion, and a medium-fidelity portion of the object design.

The design processing engine 110 may represent the various fidelity portions of the object design differently. For instance, the design processing engine 110 may represent a first fidelity portion of the object design (e.g., a low-fidelity portion) with coarse geometric elements and do so using a homogenized material property for the coarse geometric elements (708). The design processing engine 110 may further represent a second fidelity portion of the object design (e.g., a high-fidelity portion) with the high-resolution lattice elements such that the high-fidelity lattice elements are 3D and discretized into a finer granularity than the coarse geometric elements (710). In some examples, the design processing engine 110 may represent a third fidelity portion of the object design (e.g., a medium-fidelity portion) as 1D beam elements that represent the lattice structure of the object design in the third fidelity portion of the object design (712).

Using such differentiated representations of the object design at different portions of the object design, the design processing engine 110 may improve simulation speeds of object designs with lattice structures while maintaining a high-fidelity representation to properly and accurately support analysis of physical characteristics of the object design.

The logic 700 shown in FIG. 7 provides an illustrative example by which a computing system 100 may support lattice simulation using coarse geometric elements and high-resolution lattice elements. Additional or alternative steps in the logic 700 are contemplated herein, including according to any features described herein for the design access engine 108, design processing engine 110, or any combinations thereof. For example, the design processing engine 110 may identify or represent an object design using some, none, or all of the fidelity portions described in the logic 700. By implementing the logic 700 or supporting lattice simulation using coarse geometric elements and high-resolution lattice elements, a computing system may be able to perform efficient physics analysis of object designs that include complex lattice structures, which may provide faster analyses with higher fidelity and simulation accuracy.

Figure 8:
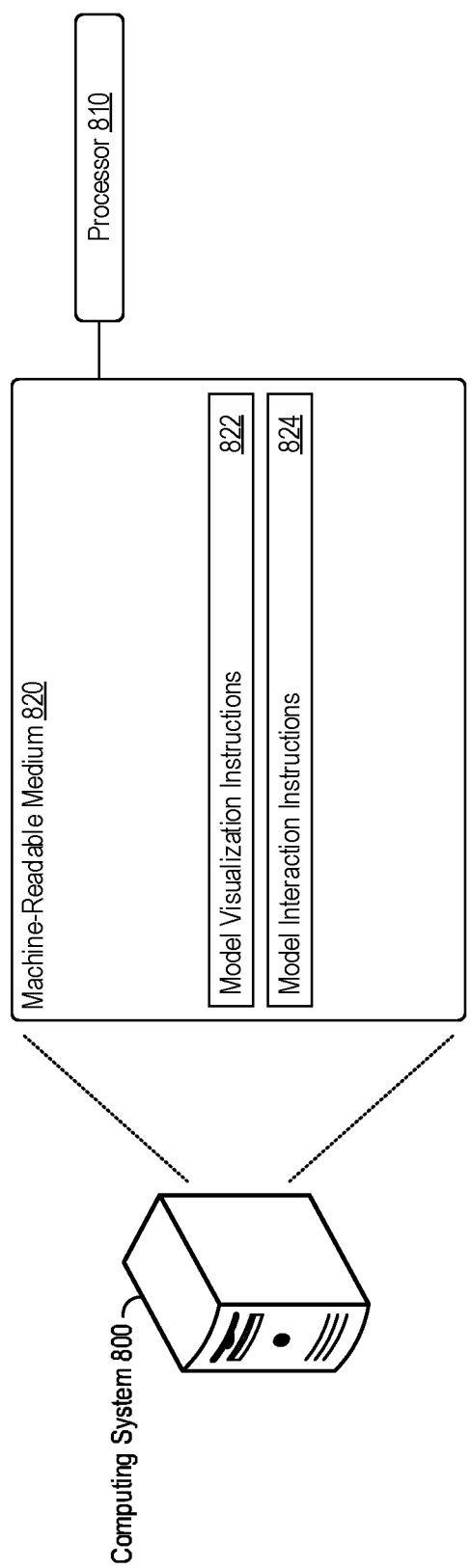
FIG. 8 shows an example of a computing system that supports object design processing using coarse geometric elements and high-resolution lattice elements.

FIG. 8 shows an example of a computing system 800 that supports object design processing using coarse geometric elements and high-resolution lattice elements. The computing system 800 may include a processor 810, which may take the form of a single or multiple processors. The processor(s) 810 may include a central processing unit (CPU), microprocessor, or any hardware device suitable for executing instructions stored on a machine-readable medium. The system 800 may include a machine-readable medium 820. The machine-readable medium 820 may take the form of any non-transitory electronic, magnetic, optical, or other physical storage device that stores executable instructions, such as the design access instructions 822 and the design processing instructions 824 shown in FIG. 8. As such, the machine-readable medium 820 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 800 may execute instructions stored on the machine-readable medium 820 through the processor 810. Executing the instructions (e.g., the design access instructions 822 and/or the design processing instructions 824) may cause the computing system 800 to perform any of the features described herein, including according to any of the features with respect to the design access engine 108, the design processing engine 110, or a combination of both.

For example, execution of the design access instructions 822 by the processor 810 may cause the computing system 800 to access an object design to be constructed through additive manufacturing. Execution of the design processing instructions 824 by the processor 810 may cause the computing system 800 to represent the object design as a combination of coarse geometric elements and high-resolution lattice elements as well as process the object design based on both the coarse geometric elements and the high-resolution lattice elements.

Any additional or alternative features as described herein may be implemented via the design access instructions 822, design processing instructions 824, or a combination of both.

The systems, methods, devices, and logic described above, including the design access engine 108 and the design processing engine 110, may be implemented in many different ways in many different combinations of hardware, logic, circuitry, and executable instructions stored on a machine-readable medium. For example, the design access engine 108, the design processing engine 110, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the design access engine 108, the design processing engine 110, or combinations thereof.

The processing capability of the systems, devices, and engines described herein, including the design access engine 108 and the design processing engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A system comprising:
a design access engine configured to access an object design to be constructed through additive manufacturing; and
a design processing engine configured to:
represent the object design as a combination of coarse geometric elements and high-resolution lattice elements; and
process the object design based on both the coarse geometric elements and the high-resolution lattice elements by simulating a lattice structure of the object design based on both the coarse geometric elements and the high-resolution lattice elements, including by:
representing a first portion of the object design with the coarse geometric elements and using a homogenized material property for the coarse geometric elements; and
representing a second portion of the object design with the high-resolution lattice elements such that the high-resolution lattice elements are 3-dimensional (3D) and discretized into a finer granularity than the coarse geometric elements.

2. The system of claim 1, wherein the second portion of the object design comprises a boundary of the object design at which a boundary condition is applied to the object design.

3. The system of claim 1, wherein the design processing engine is configured to simulate the lattice structure of the object design based on both the coarse geometric elements and the high-resolution lattice elements further by:
using a high-resolution-to-coarse boundary element at a boundary between the first portion and the second portion of the object design to connect a given coarse geometric element in the first portion to a given high-resolution lattice element in the second portion.

4. The system of claim 1, wherein the design processing engine is further to represent a third portion of the object design as 1-dimensional (1D) beam elements that represent the lattice structure of the object design in the third portion of the object design.

5. The system of claim 4, wherein the design processing engine is configured to simulate the lattice structure of the object design based on both the coarse geometric elements and the high-resolution lattice elements further by:
adding a coarse-to-1D boundary element at a boundary between the first portion and the third portion of the object design to support modeling of energy transfer between a given coarse geometric element in the first portion and a given 1D beam element in the third portion; and
adding a high-resolution-to-1D boundary element at a boundary between the second portion and the third portion of the object design to support modeling of energy transfer between a given high-resolution lattice element in the second portion and another 1D beam element in the third portion.

6. The system of claim 1, wherein the design processing engine is further configured to determine the first and second portions of the object design by:
analyzing the object design through finite element analysis to obtain a stress mapping for the object design;
identifying the first portion of the object design as a low stress portion of the stress mapping; and
identifying the second portion of the object design as a high stress portion of the stress mapping.

7. A non-transitory machine-readable medium comprising instructions that, when executed by a processor, cause a computing system to:
access an object design to be constructed through additive manufacturing;
represent the object design as a combination of coarse geometric elements and high-resolution lattice elements; and
process the object design based on both the coarse geometric elements and the high-resolution lattice elements by simulating a lattice structure of the object design based on both the coarse geometric elements and the high-resolution lattice elements, including by:

representing a first portion of the object design with the coarse geometric elements and using a homogenized material property for the coarse geometric elements; and representing a second portion of the object design with the high-resolution lattice elements such that the high-resolution lattice elements are 3-dimensional (3D) and discretized into a finer granularity than the coarse geometric elements.

8. The non-transitory machine-readable medium of claim 7, wherein the second portion of the object design comprises a boundary of the object design at which a boundary condition is applied to the object design.

9. The non-transitory machine-readable medium of claim 7, wherein the instructions cause the computing system to simulate the lattice structure of the object design based on both the coarse geometric elements and the high-resolution lattice elements further by:
using a high-resolution-to-coarse boundary element at a boundary between the first portion and the second portion of the object design to connect a given coarse geometric element in the first portion to a given high-resolution lattice element in the second portion.

10. The non-transitory machine-readable medium of claim 7, wherein the instructions, when executed, further cause the computing system to represent a third portion of the object design as 1-dimensional (1D) beam elements that represent the lattice structure of the object design in the third portion of the object design.

11. The non-transitory machine-readable medium of claim 10, wherein the instructions cause the computing system to simulate the lattice structure of the object design based on both the coarse geometric elements and the high-resolution lattice elements further by:
adding a coarse-to-1D boundary element at a boundary between the first portion and the third portion of the object design to support modeling of energy transfer between a given coarse geometric element in the first portion and a given 1D beam element in the third portion; and
adding a high-resolution-to-1D boundary element at a boundary between the second portion and the third portion of the object design to support modeling of energy transfer between a given high-resolution lattice element in the second portion and another 1D beam element in the third portion.

12. The non-transitory machine-readable medium of claim 7, wherein the instructions, when executed, further cause the computing system to determine the first and second portions of the object design by:
analyzing the object design through finite element analysis to obtain a stress mapping for the object design;
identifying the first portion of the object design as a low stress portion of the stress mapping; and
identifying the second portion of the object design as a high stress portion of the stress mapping.

13. A method comprising:
accessing an object design to be constructed through additive manufacturing;
representing the object design as a combination of coarse geometric elements and high-resolution lattice elements; and
processing the object design based on both the coarse geometric elements and the high-resolution lattice elements by simulating a lattice structure of the object design based on both the coarse geometric elements and the high-resolution lattice elements, including by:
representing a first portion of the object design with the coarse geometric elements and using a homogenized material property for the coarse geometric elements; and
representing a second portion of the object design with the high-resolution lattice elements such that the high-resolution lattice elements are 3-dimensional (3D) and discretized into a finer granularity than the coarse geometric elements.

14. The method of claim 13, wherein the second portion of the object design comprises a boundary of the object design at which a boundary condition is applied to the object design.

15. The method of claim 13, comprising simulating the lattice structure of the object design based on both the coarse geometric elements and the high-resolution lattice elements further by:
using a high-resolution-to-coarse boundary element at a boundary between the first portion and the second portion of the object design to connect a given coarse geometric element in the first portion to a given high-resolution lattice element in the second portion.

16. The method of claim 13, further comprising representing a third portion of the object design as 1-dimensional (1D) beam elements that represent the lattice structure of the object design in the third portion of the object design.

17. The method of claim 16, comprising simulating the lattice structure of the object design based on both the coarse geometric elements and the high-resolution lattice elements further by:
adding a coarse-to-1D boundary element at a boundary between the first portion and the third portion of the object design to support modeling of energy transfer between a given coarse geometric element in the first portion and a given 1D beam element in the third portion; and
adding a high-resolution-to-1D boundary element at a boundary between the second portion and the third portion of the object design to support modeling of energy transfer between a given high-resolution lattice element in the second portion and another 1D beam element in the third portion.

18. The method of claim 13, further comprising determining the first and second portions of the object design by:
analyzing the object design through finite element analysis to obtain a stress mapping for the object design;
identifying the first portion of the object design as a low stress portion of the stress mapping; and
identifying the second portion of the object design as a high stress portion of the stress mapping.

* * * * *